CIRCUIT ARRANGEMENT FOR SYNCHRONIZING AN OSCILLATOR
ON A CONTROL OSCILLATION
Filed Oct. 29, 1952

Inventor
Leendert Johan van de Polder
By Fred M Vogel
Agent

United States Patent Office 2,748,281

Patented May 29, 1956

2,748,281

CIRCUIT ARRANGEMENT FOR SYNCHRONIZING AN OSCILLATOR ON A CONTROL OSCILLATION

Leendert Johan van de Polder, Eindhoven, Netherlands, assignor to Hartford National Bank and Trust Company, Hartford, Conn., as trustee Application October 29, 1952, Serial No. 317,438

Claims priority, application Netherlands November 6, 1951

2 Claims. (Cl. 250—36)

This invention relates to a circuit arrangement for synchronizing an oscillator on a control oscillation, an oscillation derived from the control oscillation being supplied by way of a supply circuit to a phase-comparison stage, in which the phase of this derived oscillation is compared with the phase of an oscillation derived from the oscillator, the output voltage of the phase-comparison stage controlling the frequency of the oscillator and the local oscillation being supplied by way of a second supply circuit to a device controlled by the local oscillation.

Such known circuit arrangements for automatic control of frequency and phase have several advantageous properties.

Thus, for example, the natural frequency of the oscillator is comparatively insensitive to the occurrence of noise or other interference signals in the control oscillation.

Furthermore, the local oscillation remains in synchronism with the control oscillation, provided that there is no undue tendency of the natural frequency of the oscillator to vary as a result of, for example, variations in supply voltage, variations in temperature, or control of the value of one or more elements or an operating voltage of the oscillator.

If the natural frequency of the oscillator has a tendency to vary for one or more of the above-mentioned reasons, the relative phase of the local oscillation and the control oscillation is varied if synchronism is retained, since variation in the natural frequency of the oscillator results in variation of the output voltage of the phase-comparison stage, which variation in voltage neutralizes the variation in the natural frequency of the oscillator.

A further cause of phase shift occurring between the control oscillation and the local oscillation is variation in the frequency of the control oscillation.

If synchronism is then retained, the control voltage provided by the phase-comparison stage is likewise required to vary.

Such phase shifts may have undesirable consequences. Such is the case, for example, in television receivers in which synchronization of the horizontal deflection for the beam of the cathode-ray tube is effected with the use of such an automatic frequency-control and phase-control circuit. If the relative phase of the deflection current or voltage and the synchronizing signal varies, this results in shifting in the horizontal direction of the image appearing on the screen of the cathode-ray tube.

The object of the invention is to decrease the phase shift between the control oscillation and the oscillation produced in the device controlled by the oscillator upon variation in the natural frequency of the oscillator or variation in the frequency of the control oscillation.

The circuit arrangement according to the invention exhibits the characteristic that at least part of the output voltage of the phase-comparison stage is also supplied as a control voltage to a phase-shifting network included in one of the said supply circuits and exhibiting a phase shift variable with control voltage.

The invention underlies recognition of the fact that, if phase shift occurs, the output voltage of the phase-comparison stage is a measure of the value of the phase shift, so that the said output voltage may be utilized for producing a compensating phase shift.

In order that the invention may be readily carried into effect, it will now be described in greater detail with reference to the accompanying drawing, given by way of example.

Figure 1:
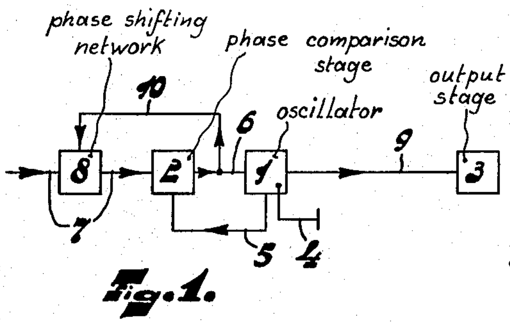
Fig. 1 is a schematic diagram of one embodiment of the circuit arrangement of the present invention in block diagram form.
Figure 2:
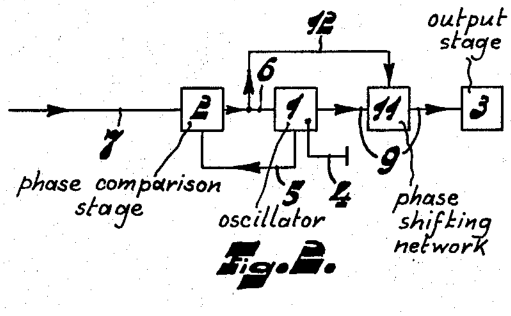
Fig. 2 is a schematic diagram of another embodiment of the circuit arrangement of the present invention in block diagram form.

The current arrangements shown in Figs. 1 and 2 each comprise an oscillator 1, a phase-comparison stage 2, a device 3 controlled by the local oscillator and a frequency control member 4 of the oscillator.

An oscillation derived from the oscillator is supplied in both Figures by way of a lead 5 back to the phase-comparison stage 2, the output voltage of which is supplied by way of a lead 6 to the oscillator 1.

In Fig. 1, the control oscillation is supplied by way of a supply circuit 7 including a phase-shifting network 8 to the phase-comparison stage 2.

The local oscillation is supplied by way of a second supply circuit 9 to the controlled device 3.

The output voltage of the phase-comparison stage 2 or, as the case may be, part of its output voltage is supplied by way of a lead 10 back to the phase-shifting network 8.

The phase shift of this network is controlled by the control voltage supplied back by way of the lead 10.

Such phase-shifting networks which are variable with control voltage are known in many forms. They may comprise, for example, a reactance tube in which the value of the reactance is a function of the control voltage supplied to the control grid of the tube. Furthermore, it is possible, as will appear hereinafter, to utilize a flip-flop multivibrator.

If the network 8 is absent and the frequency of the control oscillation or the natural frequency of the oscillator varies, phase shift between the control oscillation and the local oscillation, if synchronism is retained, occurs as a result of variation in the output voltage of the phase-comparison stage. Consequently, the said output voltage is a measure of the phase shift occurring.

With the use of the network 8, which is controlled by this output voltage, a phase shift of the control oscillation is produced, which compensates completely or almost completely the phase shift which otherwise occurs between the control oscillation and the local oscillation.

In the circuit arrangement shown in Fig. 2, the supply circuit 7 for the control oscillation does not include a network, but such a network (11) is included in the second supply circuit 9 provided between the oscillator 1 and the controlled device 3.

The phase-shifting network (11) is controlled by the output voltage of the phase-comparison stage or part of the output voltage thereof; said output voltage being supplied by way of a lead 12 to the network 11.

If, in the absence of network 11, a phase shift occurs between the control oscillation and the local oscillation, the same phase shift occurs between the control oscillation and the oscillation generated in the device 3 if it is assumed for the sake of simplicity that phase-shifting elements are included in neither of the supply circuits.

The output voltage of the phase-comparison stage 2 is a measure of this phase shift. With the use of said voltage, a phase shift is now produced in the network 11 such that the initial phase shift is compensated almost completely or completely.

As appears from the foregoing, a first point of difference between the circuit arrangements shown in Figs. 1 and 2 is that, although in the two circuits the relative phase of the control oscillation and the oscillation of the device 3 remains constant or substantially constant, in the circuit shown in Fig. 1 the relative phase of the control oscillation and the local oscillation also remains substantially constant, which is not the case in the circuit arrangement of Fig. 2, the correcting phase shift of Fig. 2 being produced after the oscillator.

A second point of difference is that in the circuit of Fig. 1 control is effected backwards in the electrical sense, whereas in Fig. 2 control takes place forwards.

The consequence thereof is inter alia that the circuit arrangement of Fig. 1 will, as a rule, be more critical insofar as the proportioning is concerned, since in such a circuit arrangement the possibility of instability due to backcoupling may exist. Such is not the case in the circuit arrangement of Fig. 2.

In the two circuit arrangements, if the control oscillation has a constant frequency, the correcting additional phase-shift may be so adjusted that, if the natural frequency of the oscillator 1 varies, irrespective of whether this is due to operation of the frequency regulator 4 or the occurrence of variations in temperature or supply voltage, phase shift between the control oscillation and the oscillation provided by the device 3 substantially does not occur.

On the other hand, it is also possible for the correcting additional phase shift to be so adjusted that, with constant natural frequency of the oscillator, but variable frequency of the control oscillation, phase shift between the control oscillation and the oscillation provided by the device 3 substantially does not occur.

However, as a rule, the control voltage required for compensating the phase shift due to variation in the natural frequency of the oscillator slightly differs from that required for compensating the phase shift due to variation in the frequency of the control oscillation, so that a different portion of the output voltage of the phase-comparison stage 2 will be required for each of the two cases.

This difference is due to the fact that, if the natural frequency of the oscillator varies, the oscillator is nevertheless forced to keep oscillating with the initial frequency, so that the duration of the period of the oscillation produced does not vary, whereas if the frequency of the control oscillation varies, the frequency of the oscillator and hence the duration of the period of the oscillation produced also varies.

Figure 3:
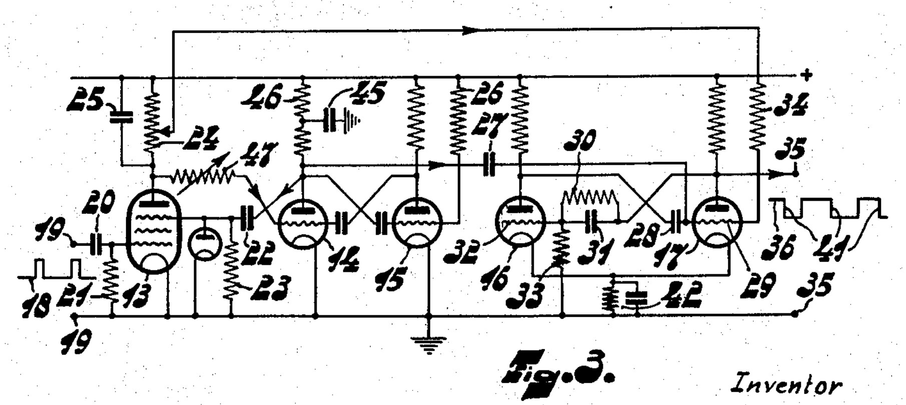
Fig. 3 is a schematic diagram of the embodiment of the circuit arrangement of Fig. 2 in detail.

Fig. 3 is a schematic diagram of the embodiment of the circuit arrangement of Fig. 2 in detail comprising electron discharge tubes 13, 14, 15, 16 and 17.

Tube 13 forms parts of the phase-comparison stage which is similar to the device 2 shown in Fig. 2.

The tubes 14 and 15, which are connected as a multivibrator, constitute the oscillator 1 of Fig. 2, the tubes 16 and 17 being included in a multivibrator circuit of the flip-flop type which is similar to the phase-shifting network 11 of Fig. 2.

The supply circuit for the control oscillation and the device controlled by the oscillator are not shown in Fig. 3.

The circuit arrangement shown in Fig. 3 may be utilized for automatic control of frequency and phase of the line deflection current in a television receiver.

The supply circuit for the control oscillation consequently comprises the means known per se in a television receiver for receiving and demodulating a high-frequency television signal and separating the line synchronization pulses from the demodulated signal.

The device 3 of Fig. 2 used in the circuit arrangement shown in Fig. 3 comprises means also known per se for generating a saw-tooth current in a deflection coil of a cathode-ray tube, which means are controlled by the voltage derived by way of the flip-flop multivibrator from the oscillator multivibrator.

In the circuit arrangement shown in Fig. 3, the line synchronization pulses 18 are supplied by way of input terminals 19, a grid condenser 20 and a grid leakage resistor 21 to the first grid of the tube 13.

A voltage originating from the oscillator and derived from the anode circuit of tube 14 is supplied to the third grid of tube 13 by way of a condenser 22 and a resistor 23, to which a diode is connected in parallel. Due to the presence of the diode, the peak voltage of the signal supplied is brought to earth potential in a manner known per se.

The tube 13 is adjusted in known manner, so that anode current can flow only if a sufficient control voltage is applied at the same time to both the first and third grids of the tube.

As will be explained more fully with reference to Fig. 4, the voltage at the third grid increases with time during part of the period of the oscillator multivibrator, so that the anode current of tube 13 is a function of the relative phase of the synchronizing pulses and the oscillation of the multivibrator.

The anode circuit of tube 13 includes an integrating network comprising the parallel combination of a resistor 24 and a condenser 25.

The voltage set up across resistor 24 is the output voltage of the phase-comparison stage which serves to control the oscillator multivibrator and which, for this purpose, is supplied by way of a variable resistor 47 to the control grid of tube 14 of the multivibrator.

The tubes of the multivibrator are coupled in known manner. The anode of tube 14 is capacitatively coupled to the control grid of the tube 15 and, on the other hand, the anode of the tube 15 is capacitatively coupled to the control grid of the tube 14.

The control grid of tube 15 is also connected by way of a resistor 26 to a point of positive potential, in this case the positive terminal of the source of anode supply.

A tapping on the anode resistor of the tube 14 is connected to ground by way of a condenser 45. The time-constant of the network constituted by the upper part 46 of said resistor and the condenser 45 is chosen to be such that a sawtooth voltage is set up across resistor 46 so that the anode voltage of tube 14 increases substantially linearly with time when the said tube is cut off.

The frequency of the multivibrator, which is dependent inter alia on the coupling condensers, the resistor 26 and the anode supply voltage, is controlled by the control which is produced by the phase-comparison stage and is supplied via resistor 47 to the tube 14.

The anode of tube 14 of the multivibrator has derived from it the oscillator voltage which is supplied by way of a condenser 27 to the control grid 29 of tube 17 of the phase-shifting network which is substantially a flip-flop of known type.

The anode of the tube 16 is connected by way of a condenser 28 to the control grid 29 of the tube 17, the anode thereof being coupled by way of a condenser 31 shunted by a resistor 30 to the control grid 32 of tube 16. This control grid is connected to ground by way of a resistor 33. The common cathode lead of the two tubes includes an RC-network 42.

The control grid 29 of tube 17 has supplied to it, by way of a resistor 34, a control voltage which serves to control the phase shift of the flip-flop multivibrator and which is derived from an adjustable tapping on the resistor 24 of the phase-comparison stage.

An output voltage 36 of the flip-flop multivibrator is derived from the anode of tube 17 and is supplied by way of terminals 35 to the device controlled by the oscillator. The operation of the flip-flop multivibrator is as follows.

If tube 17 is initially conductive, a voltage serving as a positive bias for the cathode of tube 16 is set up across the RC-network 42 included in the common cathode lead, so that tube 16 is cut off.

If, now, the anode voltage of tube 14 decreases, the variation in voltage is supplied by way of condenser 27 to the control grid 29 of tube 17, so that this tube is cut off.

The anode voltage of tube 17 then increases, which increase is supplied by way of a voltage divider 30, 33 to the control grid 32 of tube 16, so that this tube is released.

The condenser 31 serves solely to increase the speed of the variation in the operating state of tube 16.

The anode voltage of tube 16 decreases upon release, so that condenser 28 discharges.

The condenser 28 is subsequently charged again by means of the control voltage supplied by way of resistor 34.

When the control grid 29 of this tube has reached a detremined potential during this charging, tube 17 is rendered conductive again.

The moment at which this takes place thus varies with the control voltage supplied.

Figure 4:
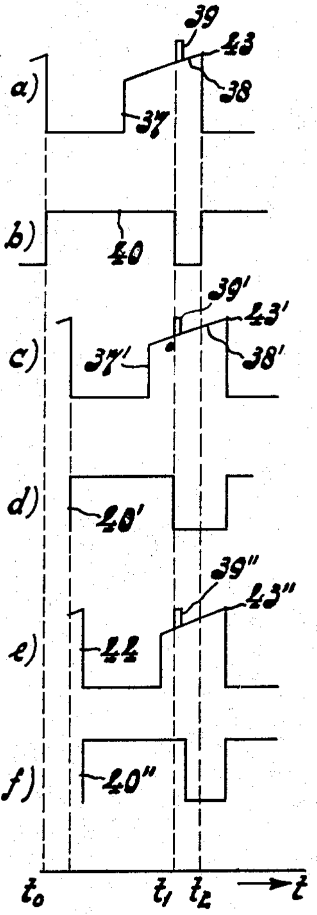
Fig. 4 is a series of curves showing the variation of some of the voltages occurring in the circuit arrangement of Fig. 3 as a function of time.

Fig. 4 is a series of curves showing the variation of some of the voltages occurring in the circuit arrangement of Fig. 3 as a function of time. The amplitudes of the curves in the vertical direction are plotted on an arbitrary scale.

In Fig. 4*a*, curve 37 shows the variation in the anode voltage of tube 14, the voltage still increasing substantially linearly with time during the period in which the tube is cut off, such as indicated at 38.

Fig. 4*a* furthermore shows at 39 the occurrence of a synchronizing pulse at the moment $t_1$, from which it appears that the amplitude of the current traversing tube 13 and hence the control voltage set up across resistor 24 is determined by the phase relation between the two voltages, since tube 13 conveys current only during the period in which the pulse and the voltage of the multivibrator overlap one another.

Fig. 4*b* shows the variation 40 of the anode voltage of tube 17. The tube 17 is cut off at the same moment as the tube 14 is released, so that this takes place at the moments $t_0$ and $t_2$, similarly as in Fig. 4*a*.

The cutting off of tube 17 is determined, however, by the control voltage supplied by way of the tapping on the resistor 24 and via resistor 34 to the control grid of tube 17.

This control voltage is chosen by adjustment of the tapping 24 to be such that tube 17 is released at the same time as the front side of the synchronizing pulse 39 occurs at the moment $t_1$.

If now, the natural frequency of the oscillator multivibrator decreases, the voltage of the multivibrator shifts to the right with respect to the moment at which the synchronizing pulse occurs.

This shown in Fig. 4*c*, in which the synchronizing pulse 39' again occurs at the moment $t_1$, but the anode voltage 37' of tube 14 is shifted along the time axis to the right.

Consequently, the pulse 39' occurs at a value of the anode voltage of tube 14 which is smaller than in the case of Fig. 4*a*, so that the anode current of tube 13, the control voltage at resistor 24 and the part derived therefrom also vary correspondingly.

By a correct choice of resistor 24 and condenser 25 and of the adjustment of the tapping on resistor 24, the moment at which tube 17 is cut off again coincides with the occurrence of the front side of the synchronizing pulse 39', such as shown in Fig. 4*d* for the anode voltage 40' of tube 17.

Such an adjustment is possible, because, as mentioned before, the anode current of tube 13 with the phase relation shown in Fig. 4*c* is smaller than with that shown in Fig. 4*a*, so that in the first-mentioned case the voltage across resistor 24 is smaller and the potential of the control grid 29 of the tube 17 will be restored more rapidly.

As shown in Figs. 4*a*, 4*b*, 4*c* and 4*d*, upon variation in the natural frequency of the oscillator multivibrator the phase of the voltage of the multivibrator varies with respect to the synchronizing pulse, but the phase relation between this pulse and the moment at which tube 17 is released remains unvaried, so that in the output voltage derived from the output terminals the flanks 41 exhibit the correct phase relation, although the relation may vary within one period of the times during which the tube 17 is cut off or released.

For synchronizing the device to be controlled by the voltage 36, it is then necessary to utilize the flanks 41, which may be effected in a simple and known manner with the use of a different network and an amplitude sieve.

When the voltage is preferred at which inclined flanks retain the correct phase relation with respect to the synchronizing pulses, the output voltage may be derived, for example, from the anode of tube 16.

The manner in which the circuit-arrangement shown in Fig. 3 should be adjusted in connection with phase shifts resulting from variation in the natural frequency of the oscillator multivibrator has been described.

In order to find out whether this adjustment is also suitable for compensating the phase shift resulting from variation in the frequency of the synchronizing pulses, it is assumed for the sake of simplicity that instead of the decrease in natural frequency as already described an increase in the frequency of the synchronizing pulses occurs such that the control voltage produced in the output circuit of the phase-comparison stage is the same as before.

Since at the third grid of tube 13 the maximum of the voltage supplied is always brought to the same potential, in this case ground potential, which maximum corresponds to point 43 in Fig. 4*a* and 43' in Fig. 4*c*, and since the slope of the flank 38, 38' respectively does not vary, the occurrence of the same control voltage implies that in the case now under consideration the pulse 39' is also shifted over the same time-interval with respect to the point 43', such as shown in Fig. 4*e*.

Since the frequency of the synchronizing pulses and hence also that of the oscillation generated by the multivibrator has increased, the duration of one period of this oscillation is shortened, however, as appears when Fig. 4*e* is compared with, for example Fig. 4*c*.

In this case, the period during which tube 14 is cut off varies, but the period during which this tube is conductive does not vary, since in the multivibrator circuit of the tubes 14 and 15 the control-grid circuit of tube 14 only has varied.

This results in the time-interval between the flank 44 and the front flank of the synchronizing pulses 39'' being shortened.

Since the tube 17 is rendered conductive in a period after the occurrence of flank 44 which is determined by the control voltage and this control voltage is given the same value as before, the tube 17 is released a little later than the moment at which the front flank of the synchronizing pulse 39'' occurs, such as shown on an exaggerated scale in Fig. 4*f*.

The difference in control voltage required for compensating the two said effects is found to be extremely small in practice, since the deviations in the frequency of the synchronizing pulses occurring, for example, in television transmission are only a few percent. It therefore suffices to choose a mean value of the control voltage to insure reasonable compensation of the two effects.

It is to be understood that the invention is not limited to the details disclosed but includes all such variations and modifications as fall within the spirit of the invention and the scope of the appended claims.

What I claim is:

1. In a circuit for synchronizing a local oscillator in accordance with a control oscillation; the combination comprising a device to be controlled by local oscillations produced by said oscillator, a phase-comparison stage, means including a first supply circuit to feed a first oscillation derived from said control oscillation as an input to said stage, means to feed a second oscillation derived from said local oscillator as another input to said stage to compare in phase with said first oscillations to produce a control voltage depending on the phase difference therebetween, means coupled to said stage to apply said control voltage to said oscillator to effect said synchronism, means including a second supply circuit coupled to said oscillator to apply said local oscillations to said device to effect control thereof, said second supply circuit further including a voltage-responsive phase-shifting network, and means coupled to said stage to apply said control voltage to said network to vary the shift thereof as a function of said control voltage.

2. In a circuit for synchronizing a local multivibrator oscillator in accordance with a control oscillation constituted by periodic pulses; the combination comprising a device to be controlled by local oscillations produced by said oscillator, a phase comparison stage, means including a first supply circuit to feed said periodic pulses as an input to said stage, means to feed said local oscillations as another input to said stage to produce a control voltage depending on the phase displacement therebetween, means to apply said control voltage to said local oscillator to effect said synchronism, and a supply circuit coupled to said local oscillator to apply said local oscillations to said device, said supply circuit including a voltage-responsive phase-shifting network comprising a flip-flop circuit provided with two cross-coupled electron discharge tubes each having a control grid and an output electrode, means to apply said control voltage to the grid of one of said tubes, means coupled to said local oscillator to derive a periodic cut-off voltage therefrom and to apply same to the grid of said one tube, and means coupled to the output electrode of said one tube to derive therefrom a control oscillation for said device.

References Cited in the file of this patent

UNITED STATES PATENTS

| | | |
|---|---|---|
| 2,433,350 | Earp | Dec. 30, 1947 |
| 2,494,795 | Bradley | Jan. 17, 1950 |
| 2,567,286 | Hugenholtz | Sept. 11, 1951 |
| 2,645,717 | Massman | July 14, 1953 |